(12) United States Patent
Zimmer et al.

(10) Patent No.: US 12,491,623 B2
(45) Date of Patent: Dec. 9, 2025

(54) PRODUCTION CELL WITH AT LEAST TWO MACHINING ROBOTS

(71) Applicants: Martin Zimmer, Rheinau (DE); Günther Zimmer, Rheinau (DE)

(72) Inventors: Martin Zimmer, Rheinau (DE); Günther Zimmer, Rheinau (DE)

( * ) Notice: Subject to any disclaimer, the term of this patent is extended or adjusted under 35 U.S.C. 154(b) by 599 days.

(21) Appl. No.: 17/775,498

(22) PCT Filed: Nov. 8, 2020

(86) PCT No.: PCT/DE2020/000272
§ 371 (c)(1),
(2) Date: May 9, 2022

(87) PCT Pub. No.: WO2021/089074
PCT Pub. Date: May 14, 2021

(65) Prior Publication Data
US 2022/0379464 A1 Dec. 1, 2022

(30) Foreign Application Priority Data
Nov. 10, 2019 (DE) .......................... 102019007763.6

(51) Int. Cl.
 *B25J 9/00* (2006.01)
 *B23Q 39/04* (2006.01)
 *B25J 11/00* (2006.01)

(52) U.S. Cl.
 CPC ............ *B25J 9/0084* (2013.01); *B23Q 39/04* (2013.01); *B25J 11/005* (2013.01)

(58) Field of Classification Search
 CPC .... B23Q 39/04; B23Q 39/029; B23Q 39/028; B23Q 39/024; B23Q 39/023;
 (Continued)

(56) References Cited

U.S. PATENT DOCUMENTS

| 5,170,876 A | 12/1992 | Sticht |
| 6,067,695 A | 5/2000 | Momoitio |

(Continued)

FOREIGN PATENT DOCUMENTS

| CN | 203171150 U | 9/2013 |
| CN | 204036024 U | 12/2014 |

(Continued)

OTHER PUBLICATIONS

Machine Translation of DE 102006027013 (which DE '013 was published Jan. 3, 2008).*

(Continued)

*Primary Examiner* — Sunil K Singh
*Assistant Examiner* — Eric Daniel Whitmire
(74) *Attorney, Agent, or Firm* — Smartpat PLC

(57) ABSTRACT

A manufacturing cell comprises at least one workpiece path having a workpiece supply region of a workpiece supply and a workpiece table of a machine tool. The machine tool has at least two machining robots. The workpiece table comprises at least one suction block assembly. The manufacturing cell has a second workpiece path running in a longitudinal direction of the manufacturing cell and parallel to the first workpiece path, with a second workpiece table comprising at least one suction block assembly. In addition, each suction block assembly can be displaced in the longitudinal direction of the manufacturing cell. This increases the output rate of a manufacturing cell and expands its machining capabilities.

16 Claims, 5 Drawing Sheets

(58) Field of Classification Search
CPC .... B23Q 39/022; B23Q 39/021; B23Q 39/02; B23Q 2039/006; B23Q 2039/002; B23Q 7/05; B23Q 7/055; B23Q 7/1421; B23Q 7/1468; B23Q 2707/05; B23Q 3/088; B23Q 2703/04; B23Q 1/035; B23Q 1/037; B23Q 16/001; Y10T 29/5105; Y10T 29/5107; Y10T 29/5124; Y10T 29/5196; Y10T 409/308176; Y10T 409/3084; Y10T 409/308624; Y10T 409/30868; Y10T 409/308736; B65G 13/02; B65G 13/04; B65G 13/06; B65G 2205/00; B65G 47/8815; B65G 47/8823; B25B 11/005

See application file for complete search history.

(56) References Cited

U.S. PATENT DOCUMENTS

| | | | |
|---|---|---|---|
| 6,488,060 B1 * | 12/2002 | Giovanni | B25B 11/005 269/21 |
| 6,764,434 B1 | 7/2004 | Volk | |
| 2012/0195718 A1 | 8/2012 | Grob et al. | |
| 2017/0297218 A1 | 10/2017 | Friese et al. | |
| 2018/0250781 A1 * | 9/2018 | Gauli | B25J 9/0084 |
| 2021/0129271 A1 | 5/2021 | Süss | |

FOREIGN PATENT DOCUMENTS

| | | | | |
|---|---|---|---|---|
| CN | 105437177 | A | 3/2016 | |
| CN | 102626884 | B | 8/2016 | |
| CN | 107649790 | A | 2/2018 | |
| CN | 110087824 | A | 8/2019 | |
| CN | 110385557 | A | 10/2019 | |
| CN | 107243742 | B | 3/2023 | |
| DE | 29807071 | U1 | 7/1998 | |
| DE | 20309779 | U1 | 9/2003 | |
| DE | 10214554 | A1 | 10/2003 | |
| DE | 102004053519 | | 5/2006 | |
| DE | 102006027013 | | 1/2008 | |
| DE | 102006027013 | B3 * | 1/2008 | B23D 47/04 |
| DE | 102007044589 | A1 | 4/2008 | |
| DE | 102010053657 | A1 * | 6/2011 | B21D 43/18 |
| DE | 202011002384 | U1 | 5/2012 | |
| DE | 102013212901 | A1 * | 1/2015 | B23Q 1/037 |
| DE | 102015212541 | A1 | 3/2016 | |
| DE | 102017012077 | A1 | 7/2018 | |
| DE | 102017104246 | A1 | 9/2018 | |
| EP | 0835720 | A1 | 4/1998 | |
| EP | 1810803 | A1 | 7/2007 | |
| EP | 2153955 | A1 * | 2/2010 | B27M 1/08 |
| EP | 2153955 | B1 | 12/2012 | |
| EP | 3750677 | A1 | 12/2020 | |
| ES | 2146138 | | 7/2000 | |
| FR | 3056932 | A1 | 4/2018 | |
| JP | 2009178797 | A | 8/2009 | |
| WO | 03097296 | A1 | 11/2003 | |
| WO | 2014177997 | A1 | 11/2014 | |

OTHER PUBLICATIONS

Zimmer, Martin et al., co-pending U.S. Appl. No. 17/775,474, filed May 9, 2022, U.S. national phase entry of PCT/DE2020/000271.

Zimmer, Martin et al., co-pending U.S. Appl. No. 17/775,508, filed May 9, 2022, U.S. national phase entry of PCT/DE2020/000273.

* cited by examiner

PRODUCTION CELL WITH AT LEAST TWO MACHINING ROBOTS

TECHNICAL FIELD

The disclosure relates to a manufacturing cell with at least one workpiece path having a workpiece supply region of a workpiece supply and a workpiece table of a machine tool.

BACKGROUND

A manufacturing cell is known from DE 10 2017 104 246 A1. Workpiece machining takes place in a workpiece clamp by means of two machining robots.

SUMMARY

An improved manufacturing cell includes at least one workpiece path having a workpiece supply region of a workpiece supply and a workpiece table of a machine tool. The machine tool has at least two machining robots. The workpiece table comprises at least one suction block assembly.

To achieve an increased output rate and expanded machining capabilities, the manufacturing cell has a second workpiece path running in a longitudinal direction of the manufacturing cell and parallel to the first workpiece path, with a second workpiece table comprising at least one suction block assembly. In addition, each suction block assembly can be displaced in the longitudinal direction of the manufacturing cell.

The manufacturing cell enables the machining of a large number of workpieces with different geometric shapes and different arrangements of machining regions and workpiece apertures. The workpiece-specific arrangement of the suction block assemblies relative to the longitudinal direction of the manufacturing cell makes it possible to avoid damage to the suction block assemblies during the cutting machining of the workpiece. In addition, the supply of a subsequent workpiece along with its transport to the workpiece table can already take place during the machining of a first workpiece. This makes it possible to achieve a high degree of utilization of the manufacturing cell even with a batch size of one.

Further details of the invention will be apparent from the following description of schematically illustrated embodiments.

DETAILED DESCRIPTION

Figure 1:
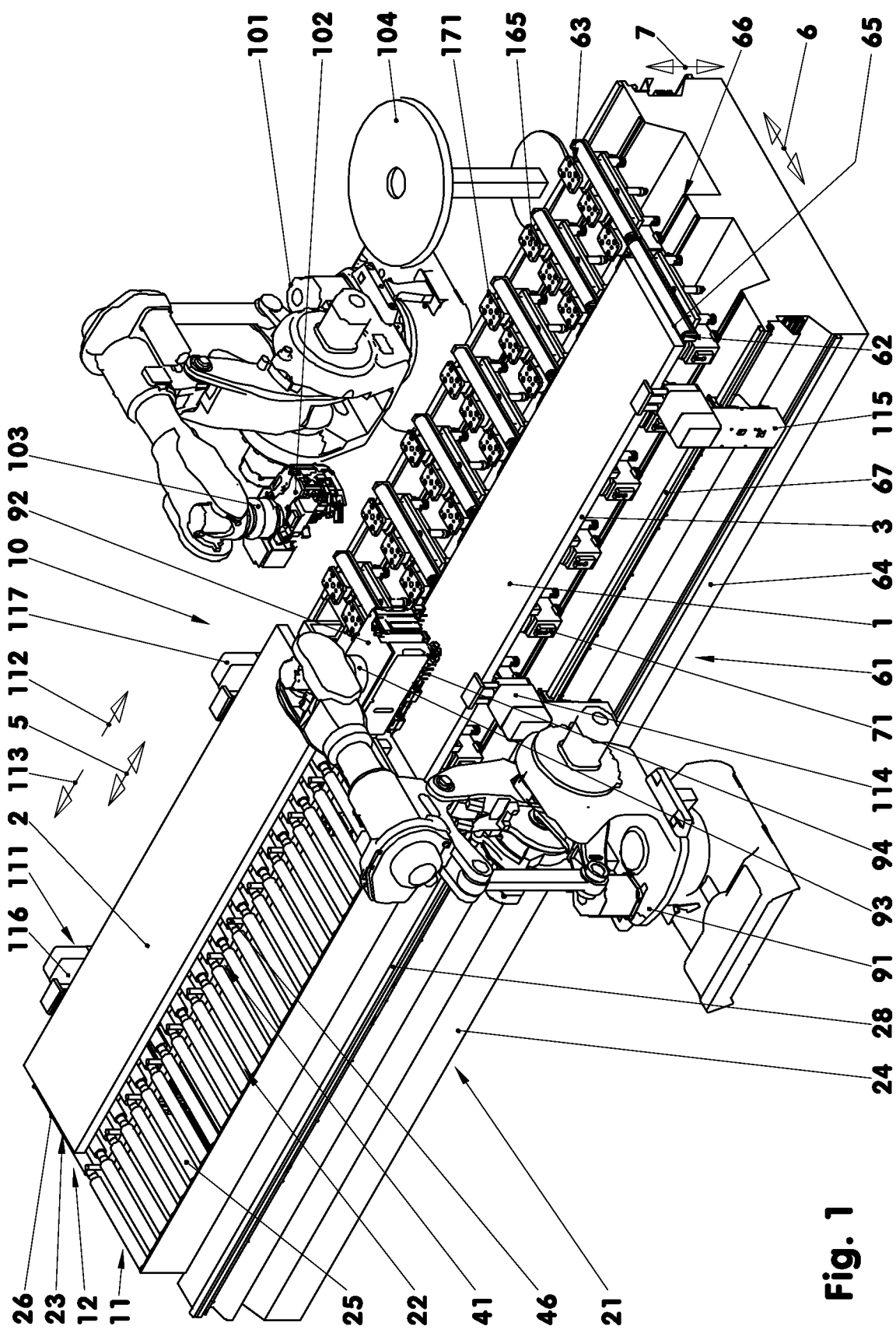
FIG. 1: Manufacturing cell.

FIGS. 1-7 show a manufacturing cell (10) and some assemblies of this manufacturing cell (10). The manufacturing cell (10) includes a workpiece supply (21) and a machine tool (61) connected to the workpiece supply (21). In the workpiece supply (21), the workpieces (1; 2) loaded, for example, by means of a handling device or manually, are aligned and taken over by a conveyor device (111) of the manufacturing cell (10). By means of the conveyor device (111), the workpieces (1; 2) are then conveyed from the workpiece supply (21) to the machine tool (61) and, after machining, to a workpiece removal unit. In the exemplary embodiment, the workpiece removal takes place after machining in the workpiece supply (21). However, it is also conceivable to arrange the respective workpiece removal unit in a manner spatially separate from the workpiece supply (21). The workpiece (1; 2) is transported from the workpiece supply (21) to the machine tool (61) in a first conveying direction (112). For removal, the workpiece (1; 2) in the illustrated embodiment is transported in a second conveying direction (113) directed against such first conveying direction (112). The conveying directions (112, 113) are oriented in the longitudinal direction (5) of the manufacturing cell (10). It is also conceivable to transport the machined workpiece (1; 2) further in the conveying direction (112). For example, the workpiece removal unit or another manufacturing station of an interlinked manufacturing process is then located on the side of the machine tool (61) turned away from the workpiece supply (21).

The manufacturing cell (10) has two adjacent workpiece paths (11, 12) oriented parallel to one another in the longitudinal direction (5). In the workpiece supply (21), each of such workpiece paths (11; 12) has a workpiece supply region (22; 23). Furthermore, the individual workpiece path (11; 12) in the machine tool (61) has a working region (62; 63) along with a workpiece table (65; 165) in each case. The respective working region (62; 63) is the spatial region in which the individual workpiece (1; 2) interacts with the respective machining tool unit (92; 102).

Figure 2:
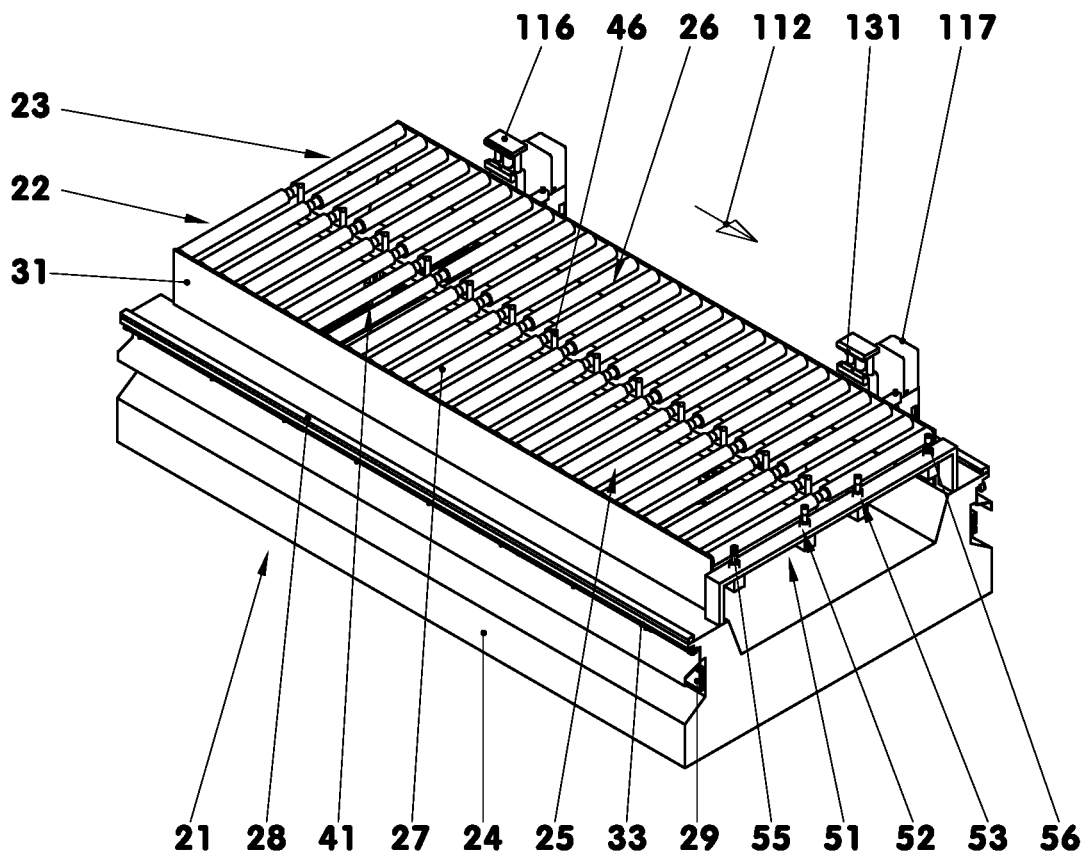
FIG. 2: Workpiece supply.

In the exemplary embodiment, the workpiece supply (21), see FIG. 2, comprises a bed (24) that supports two adjacent load-bearing roller paths (25, 26), a transverse thrust device (41) and two stop devices (52, 53) seated, for example, on a common stop bar (51). The bed (24) has external workpiece carriage guide rails (28) and conductor paths (29). The workpiece carriage guide rails (28) and the conductor paths (29) continue on the machine bed (64) of the machine tool (61). Workpiece carriages (114-117) of the conveyor device (111) can be displaced along the workpiece carriage guide rails (28). In the exemplary embodiment, the conveyor device (111) comprises two workpiece carriages (114, 115; 116, 117) per workpiece path (11; 12). The power supply and control of the self-propelled workpiece carriages (114-117) is provided by means of the conductor paths (29).

The individual load-bearing roller path (25; 26) comprises a plurality of load-bearing rollers (27) lying transverse to the conveying direction (112) and parallel to one another. These can be of rigid design or, for example, can be arranged on a rigid axle in rolling bearings. In the exemplary embodiment, all load-bearing rollers (27) are identical to one another. The width of the individual load-bearing roller (27) is generally greater than or equal to the maximum width of a workpiece (1; 2) to be machined in the transverse direction (6). The load-bearing rollers (27) project beyond the lateral load-bearing roller supports (31) oriented in the longitudinal direction (5) in the height direction (7).

Figure 3:
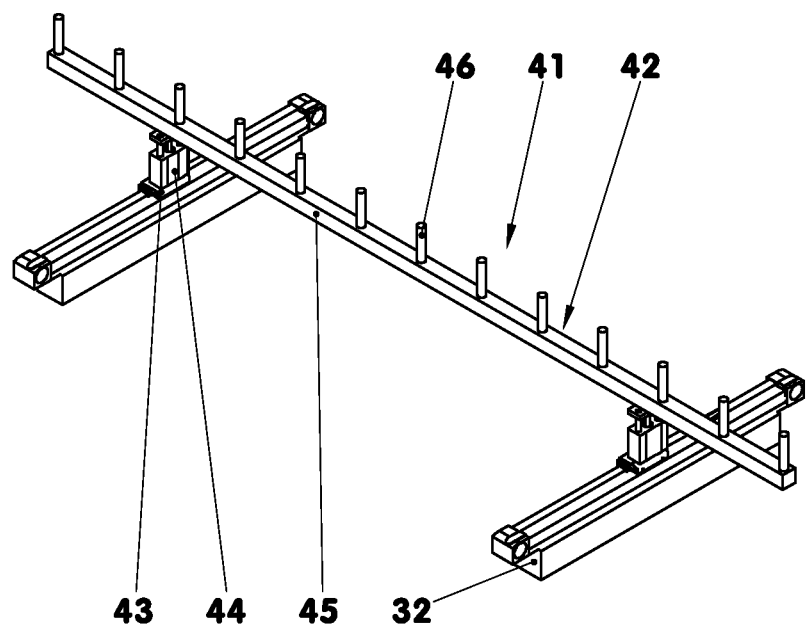
FIG. 3: Transverse thrust device.

FIG. 3 shows a transverse thrust device (41). In the exemplary embodiment, this has a rake (42) that can be displaced in the transverse direction (6). The transverse thrust device (41) has two transverse guides (32) anchored in the bed (24), each of which carries a transverse slide (43) that can be displaced relative thereto. The stroke of the transverse slide (43) in the transverse direction (6) is, for example, 40% greater than the width of a load-bearing roller path (25; 26) in such direction. The two transverse slides

(43) are driven synchronously with one another, for example. A lifting device (44) which acts on a height-adjustable tine carrier (45) of the rake (42) oriented in the longitudinal direction (5) sits on each of the transverse slides (43). Both, for example, hydraulically operated lifting devices (44) are coupled, such that the tine carrier (45) is always horizontal. Tines (46) project upwards from the tine carrier (45). In the exemplary embodiment, the tines (46) are cylindrical pins. When the rake (42) is mounted and raised, the tines (46) are positioned, for example, between two load-bearing rollers (27) of a load-bearing roller path (25; 26). The lifting devices (44) are designed in such a way that, when the tines (46) are extended, they project beyond the supporting plane of the load-bearing roller path (25; 26) by 70% of the stroke. When the lifting device (44) is lowered, the tines (46) are recessed below the supporting plane of the load-bearing roller path (25; 26). The supporting plane of the load-bearing roller path (25; 26) tangent to the upper side of the load-bearing roller path (25; 26) is also referred to below as the conveying plane of the manufacturing cell (10). Instead of a rake (42), the transverse thrust device (41) can also have a pivoting lever, a thrust wedge, etc.

Figure 4:
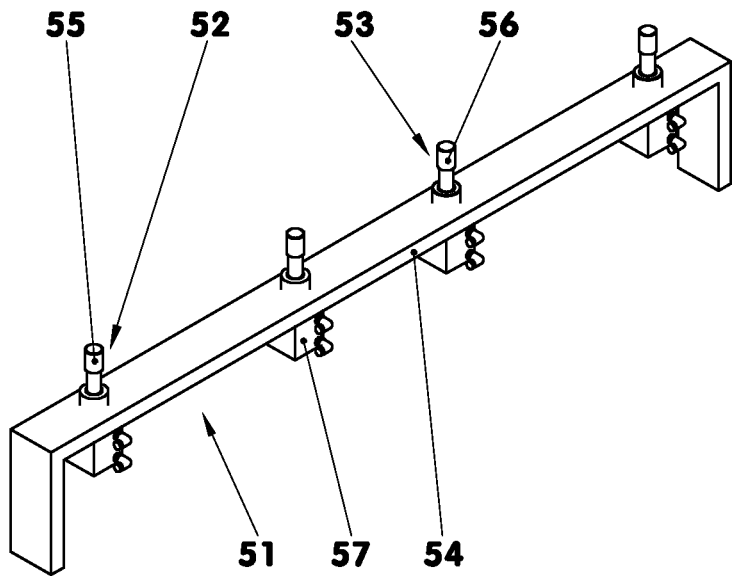
FIG. 4: Stop bar.
Figure 8:
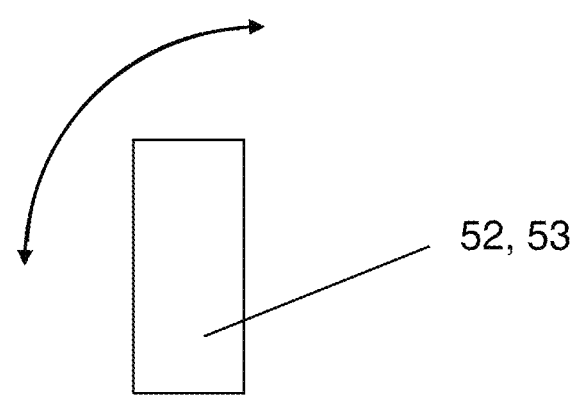
FIG. 8: Tiltable stop devices.

FIG. 4 shows a stop bar (51). This is oriented in the transverse direction (6) and is arranged at the end of the workpiece supply (21) turned towards the machine tool (61). The stop bar (51) has a pin carrier (54) that supports two stop devices (52, 53), each with two stop pins (55; 56). Each stop pin (55; 56) is adjustable between a retracted and an extended position by means of a double-acting cylinder (57). In the extended position shown, the stop pins (55, 56) project 85% of their vertical stroke beyond the conveying plane. In the retracted position, the stop pins (55, 56) are below the conveying plane. The stroke adjustment of the hydraulic cylinders (57) is carried out, for example, in groups per stop device (52; 53). FIG. 8 schematically shows tiltable stop devices (52; 53) that may be used instead of the lowerable stop devices shown in FIG. 4.

Figure 5:
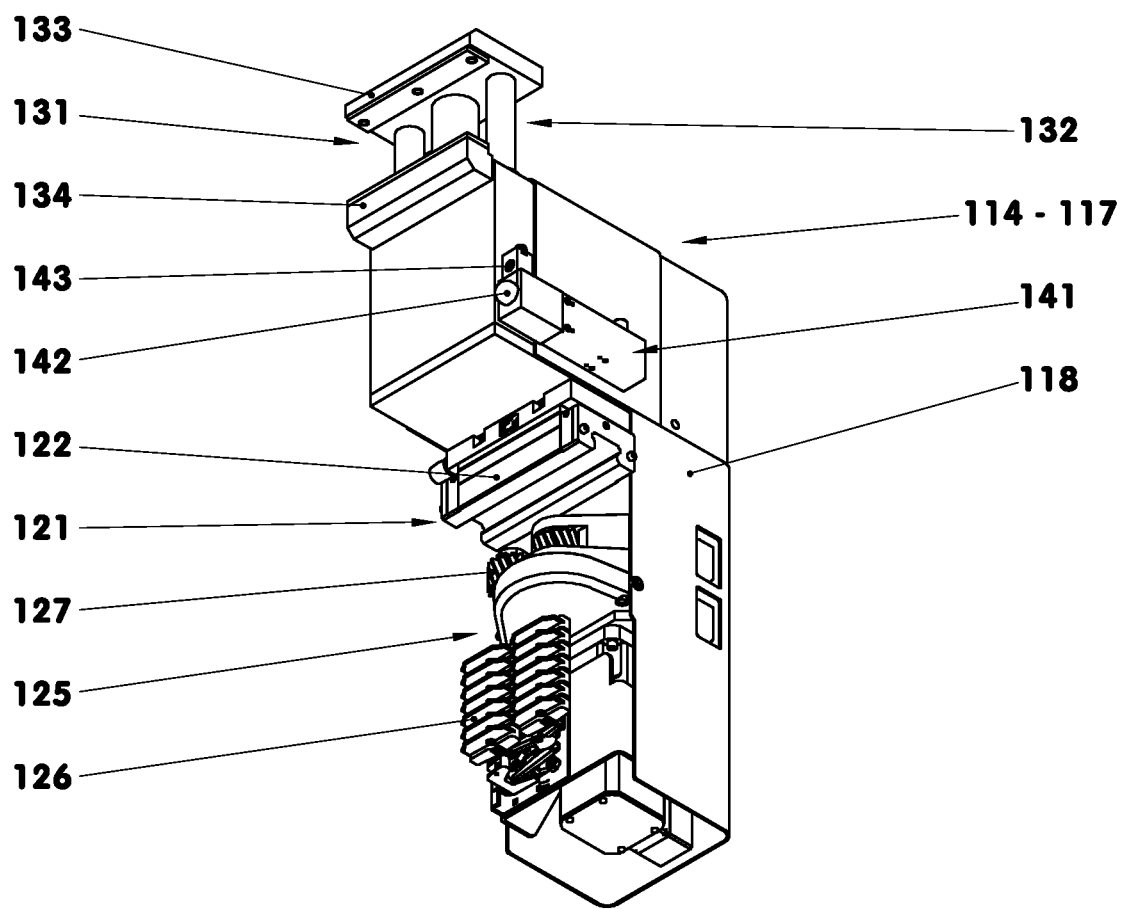
FIG. 5: Workpiece carriage.

FIG. 5 shows a workpiece carriage (114; 115; 116; 117). The manufacturing cell (10) shown in the exemplary embodiment has four workpiece carriages (114-117) of the same kind. Two of such workpiece carriages (114, 115) are guided along the right side of the manufacturing cell (10) as seen in the conveying direction (112), while the two other workpiece carriages (116, 117) are guided along the left side. It is also possible to use more or fewer than the number of workpiece carriages (114-117) shown. For example, a single workpiece carriage (114; 115; 116; 117) can be used for each workpiece path (11; 12).

The individual workpiece carriage (114; 115; 116; 117) has a guide unit (121), a drive unit (125) and a gripping unit (131). The above units (121, 125, 131) are integrated in a housing (118). In the exemplary embodiment, a docking coupling (141) is arranged on the external side of the housing (118).

The guide unit (121) comprises a recirculating ball bearing unit (122) that, when the workpiece carriage (114; 115; 116; 117) is mounted, engages around the workpiece carriage guide rail (28) of the workpiece supply (21) and/or the workpiece carriage guide rail (67) of the machine tool (61). In this case, the workpiece carriage guide rails (28, 67) are fastened in the longitudinal direction (5) oriented on the bed (24) of the workpiece supply (21) or on the machine bed (64) of the machine tool (61).

The drive unit (125) has a power and signal supply (126). When the workpiece carriage (114; 115; 116; 117) is mounted, this is in spring-loaded contact with the conducting paths (29) of the bed (24) or the machine bed (64). A drive motor arranged in the workpiece carriage (114; 115; 116; 117) drives a drive wheel (127) that, when the workpiece carriage (114; 115; 116; 117) is mounted, meshes with a toothed rack (33) fastened laterally to the bed (24) or to the machine bed (64).

The gripping unit (131) is arranged above the guide unit (121). It comprises a parallel gripping device (132) with two clamping jaws (133, 134) movable relative to one another. In the exemplary embodiment, both clamping jaws (133, 134) are displaceable relative to the housing (118) of the workpiece carriage (114; 115; 116; 117). The opening and closing directions of the parallel gripping device (132) are oriented in the height direction (7). A height adjustment of the entire gripping unit (131) relative to the guide unit (121) is also conceivable. Both clamping jaws (133, 134) can also be adjusted in height in an individually driven manner.

The gripping unit (131) can also be asymmetrical. For example, the lower clamping jaw (134) can have a shorter stroke than the upper clamping jaw (133).

For example, the docking coupling (141) has a retractable plunger (142) and a plug (143). The plug (143) can be used to transmit electrical power, data and/or media, for example compressed air for pneumatic functions. In the exemplary embodiment, a suction block assembly (71; 171) of the machine tool (61) can be coupled to the docking coupling (141). The individual workpiece carriage (114; 115; 116; 117) can also be formed without the docking coupling (141).

Figure 6:
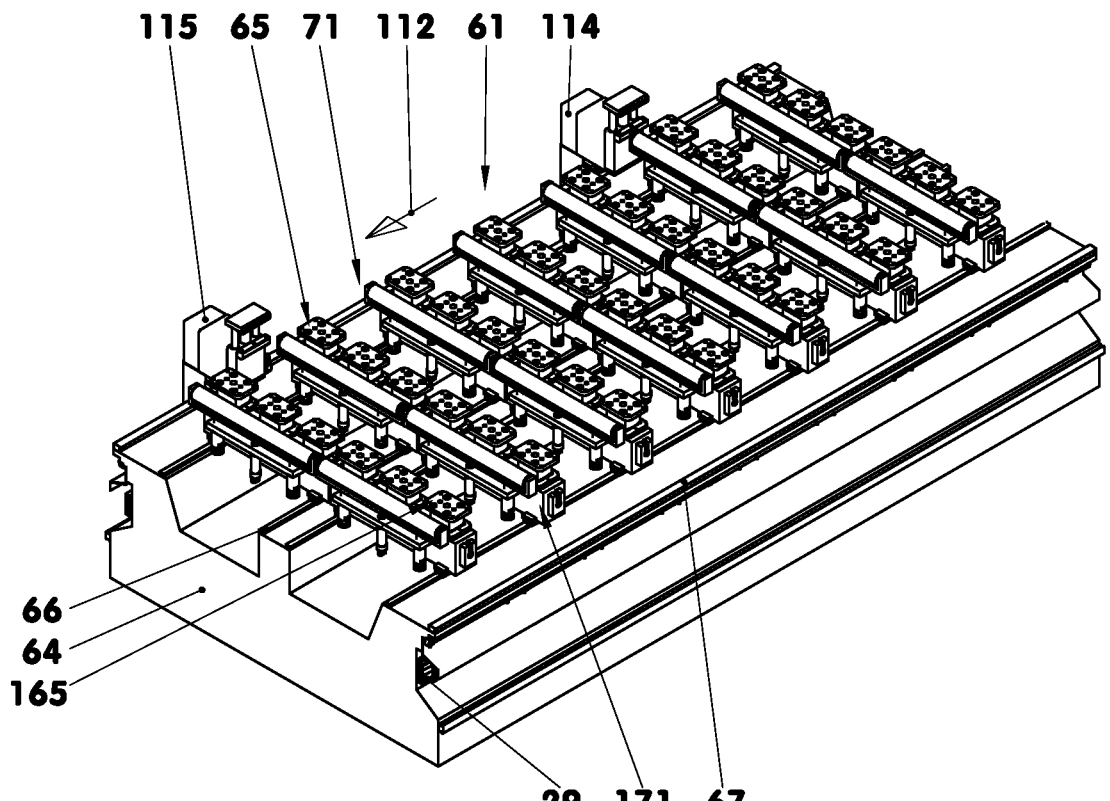
FIG. 6: Machine tool without a machining robot.

FIG. 6 shows the machine tool (61) of the manufacturing cell (10) without the machining robot (91, 101). Two workpiece tables (65, 165) are arranged side by side in the machine bed (64). One of the workpiece tables (65; 165) is assigned to each of the workpiece paths (11; 12). The parting line of the two workpiece tables (65, 165) runs in the vertical center longitudinal plane of the machine bed (64). Each of the workpiece tables (65; 165) includes at least one suction block assembly (71; 171). In the exemplary embodiment, each workpiece table (65; 165) has a plurality of suction block assemblies (71; 171). The individual suction block assemblies (71; 171) are guided in the machine bed (64) so that they can be displaced in the longitudinal direction (5). The machine bed (64) has suction block guide paths (66) oriented in the longitudinal direction (5) for this purpose. Furthermore, a chip removal device can be arranged in the machine bed (64).

Figure 7:
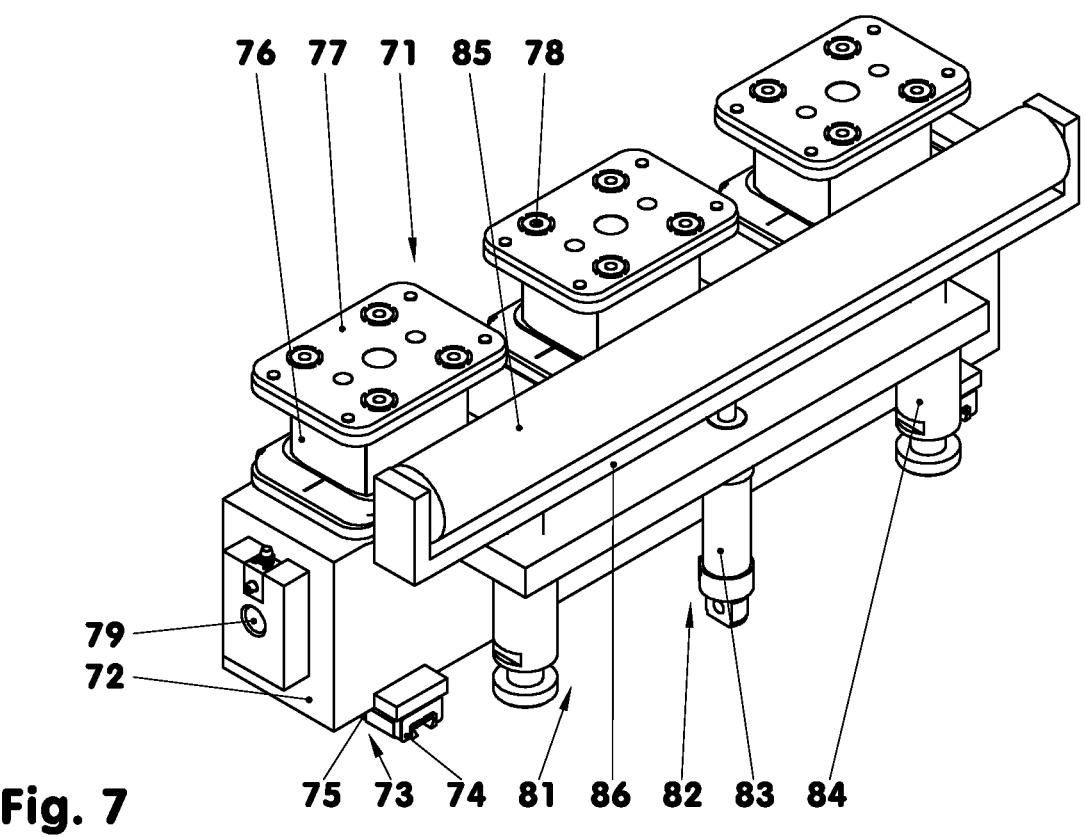
FIG. 7: Suction block assembly.

FIG. 7 shows a suction block assembly (71; 171). All suction block assemblies (71; 171), for example, are constructed in the same way. In this case, the suction block assemblies (71) of the first workpiece path (11) are designed to be mirror-inverted to the suction block assemblies (171) of the second workpiece path (12). The individual suction block assembly (71; 171) has a support beam (72) with two guide assemblies (73) for guidance along the machine bed (64). The single guide assembly (73) has two guide shoes (74) spaced apart in the longitudinal direction (5), between which a hydraulically or pneumatically releasable clamping device (75) is located. This, for example, spring-loaded closing clamping device (75) secures the position of the suction block assembly (71; 171) relative to the machine bed (64) in the longitudinal direction (5).

The support beam (72) is oriented in the transverse direction (6). For example, it carries three suction elements sitting next to one another (76). These have an approximately rectangular suction surface (77) with four suction cups (78). In the exemplary embodiment, the suction elements (76) are designed to be individually adjustable in height. However, they can also be designed to be rigid. Each suction element (76) and/or suction cup (78) can be controlled individually with negative pressure.

A support device (81) is arranged on the support beam (72). This support device (81) has a lifting device (82) that has a central lifting cylinder (83) and two guide cylinders (84). The lifting device (82) carries a transverse support roller (85). The support roller (85) is rotatably mounted in a U-shaped support beam (86), for example. A rigid arrangement of the individual support roller (85) is also conceivable. The lifting device (82) is designed in such a way that the support plane lying parallel to the conveying plane and tangent to the upper surface line of the support roller (85) can be adjusted from a standby position lying below the suction surface (77) to a support position lying above the suction surface (77).

A support beam coupling (79) is arranged at the end face of the support beam (72). This is designed, for example, to complement the docking coupling (141) of the workpiece carriages (114-117).

A machining robot (91; 101) is arranged on each side of the machine tool (61). Each of such machining robots (91; 101) carries a tool unit (92; 102). The machining robot (91) on the right in the conveying direction (112) carries a drilling and milling unit (92) as a tool unit (92) in the illustration of FIG. 1. For example, a tool (94) of such drilling and milling unit (92) is a drilling tool (94). In the exemplary embodiment, the machining robot (101) standing on the left in the conveying direction (112) is equipped with a gluing unit (102), for example for joining a workpiece coating. It is also conceivable to use more than two machining robots (91; 101) in the machine tool (61).

Each of the illustrated machining robots (91; 101) can machine workpieces (1, 2) on both workpiece paths (11, 12). The single machining robot (91; 101) can have a multiple telescopic arm for this purpose. It is also conceivable to displace the individual machining robot (91; 101) in the longitudinal direction (5) and/or in the transverse direction (6) relative to the machine bed (64).

In the exemplary embodiment, the individual machining robot (91; 101) has at least one vertical swivel axis oriented in the height direction (7) and at least one horizontal swivel axis oriented parallel to the workpiece table (65; 165). Furthermore, the respective tool unit (92; 102) has a multi-axis swivel head (93; 103). A different design of the Cartesian axes and/or the swivel axes of the machining robots (91; 101) is also conceivable.

An edge gluer (104) is also arranged on the machine tool (61). This can be used to coat the edges of the workpiece (1; 2).

In the manufacturing cell (10), for example, no workpiece (1; 2) is initially provided in the workpiece supply (21). At least two workpiece carriages (114, 115; 116, 117) are positioned on one side in the region of the workpiece supply (21). The gripping units (131) of such workpiece carriages (114, 115; 116, 117) are open. The rake (42) of the transverse thrust device (41) is lowered. A first workpiece (1; 2) is deposited in the workpiece supply (21), for example by means of a hall conveyor device. Such first workpiece (1; 2) is designed to be, for example, plate-shaped. It consists, for example, of wood, plastic, aluminum, steel, a composite material, etc. The deposited workpiece (1; 2) is only roughly oriented when deposited, for example. For example, the longitudinal direction of the workpiece can deviate by 30 degrees from the longitudinal direction (5) of the manufacturing cell (10).

After the first workpiece (1; 2) has been deposited, the rake (42) travels in the transverse direction (6) until it is on the side of the workpiece (1; 2) turned away from the workpiece carriages (114, 115; 116, 117). The lifting devices (44) then lift the tine carrier (45) and the tines (46) until the tines (46) project above the conveying plane. Now, the rake (42) can move the first workpiece (1; 2) in the direction of the gripping units (131) of the workpiece carriages (114, 115; 116, 117) until the workpiece (1; 2) lies between the clamping jaws (133, 134). In this case, the workpiece (1; 2) is aligned in such a way that the longitudinal side (3) of the workpiece received in the gripping units (131) is oriented in the longitudinal direction (5) of the manufacturing cell (10).

The manual loading and/or alignment of the workpiece (1; 2) is also conceivable. In this case, the workpiece (1; 2) deposited on the load-bearing rollers (27) is pushed by the operator to the workpiece carriages (114, 115; 116, 117) of the workpiece path (11; 12) provided for machining.

After the gripping units (131) have been closed, the workpiece carriages (114, 115; 116, 117) pull the workpiece (1; 2) along the load-bearing rollers (27) in the conveying direction (112) until the workpiece (1; 2) rests against at least one stop pin (55; 56) of the workpiece path (11; 12). It is also conceivable that, when the gripping units (131) are closed, the workpiece (1; 2) is lifted off the load-bearing roller path (25; 26) by a small amount, for example less than five millimeters. For example, it is then parallel to the conveying plane. From the workpiece position at the stop device (52; 53) and the position of the workpiece carriages (114, 115; 116, 117) relative to the bed (24) in the longitudinal direction (5), the position of the workpiece (1; 2) relative to the workpiece carriages (114, 115; 116, 117) can be determined.

In the machine tool (61), for example, free workpiece carriages (114, 115; 116, 117) or adjustment carriages are used to adjust the position of the suction block assemblies (71; 171) in the longitudinal direction (5). When using adjustment carriages, for example, these are constructed in the same way as the workpiece carriages (114-117), but do not have a gripping unit (131). To adjust the individual suction block assembly (71; 171), a workpiece carriage (114; 115; 116; 117) couples to a suction block assembly (71; 171) by means of the docking coupling (141). The clamping of the suction block assembly (71; 171) to the suction block guide path (66) is released and the workpiece carriage (114; 115; 116; 117) displaces the suction block assembly (71; 171) to the desired position in a manner specific to the workpiece. Furthermore, those suction elements (76) which are located in the region of the workpiece (1; 2) to be machined are lowered. This prevents, for example, damage to the suction block assembly (71; 171) during the cutting machining of the workpiece (1; 2). The workpiece carriage (114; 115; 116; 117) is then uncoupled from the suction block assembly (71; 171) and the clamping device (75) of the suction block assembly (71; 171) is activated on the machine bed (64).

The suction block assemblies (71; 171) can also be adjusted by means of the workpiece carriages (114, 115; 116, 117) conveying the workpiece (1; 2). For this purpose, for example, after the workpiece (1; 2) has been deposited on the support rollers (85), the gripping unit (131) of a workpiece carriage (114; 115; 116; 117) is opened while at least one other workpiece carriage (115; 114; 117; 116) holds the workpiece (1; 2). By means of the free workpiece carriage (114; 115; 116; 117), one or more of the suction block assemblies (71; 171) can now be adjusted. After clamping the workpiece (1; 2) again by means of this workpiece carriage (114; 115; 116; 117), another workpiece carriage (115; 114; 117; 116) can be used to adjust further suction block assemblies (71; 171).

The suction block assemblies (71; 171) can also be individually displaceable relative to the machine bed (64). For this purpose, for example, each suction block unit (71; 171) has a drive unit that rolls, for example, on a toothed rack on the machine bed side. With such an embodiment, the docking couplings (141) of the workpiece carriages (114; 115; 116; 117) and the support beam couplings (79) of the suction block assemblies (71; 171) can be omitted. For example, the adjustment of the suction block assemblies (71; 171) in the longitudinal direction (5) takes place in a manner specific to the workpiece during the alignment of the workpiece (1; 2) to be machined in the workpiece supply (21).

After lowering the stop pins (55; 56) of the first workpiece path (11; 12), the workpiece carriages (114, 115; 116; 117) displace the first workpiece (1; 2) further in the conveying direction (112) to the machine tool (61). Here, the workpiece carriages (114, 115; 116, 117) are stopped, such that the workpiece (1; 2) lies on the support rollers (85) at the provided position in the respective working region (62; 63) of the machine tool (61). Then, for example, the suction elements (76) provided are raised and/or the support rollers (85) are lowered until the workpiece (1; 2) lies on the designated suction elements (76). The support rollers (85) are lowered further until they are below the working region (62; 63) of the tool units (91; 101).

It is also conceivable to lift the support rollers (85) after positioning the workpiece carriages (114, 115; 116, 117), such that the respective workpiece (1; 2) lies on the support rollers (85) after opening the gripping elements (131). The support rollers (85) are then lowered by means of the support roller lifting devices (82) until they are below the support plane. In this case, the workpiece (1; 2) is deposited on the suction elements (76). In this case, the height-adjustable gripping units (131), for example, can continue to hold the workpiece (1; 2).

By means of a vacuum pump, which acts on the suction cups (78) covered by the workpiece (1; 2) and resting on the workpiece (1; 2), the first workpiece (1; 2) is fixed in the machining position. In this case, for example, the lifting devices of the gripping units (131) are lowered as the negative pressure increases. After fixing the workpiece (1; 2) by means of the suction elements (76), the gripping units (131) can be released from the workpiece (1; 2) if necessary. The workpiece (1; 2) can now be machined by means of the tool units (92, 102) and the edge gluer (104). In this case, for example, all the tool units (92; 102) arranged on the machining robots (91, 101) and the edge gluer (104) can be used to machine a workpiece (1; 2). For example, it is conceivable to machine the workpiece (1; 2) completely in one clamping operation.

While the first workpiece (1; 2) is being machined, a second workpiece (2; 1) can be provided. The workpiece carriages (116, 117; 114, 115) of the second workpiece path (12; 11) are used for this purpose. The second workpiece (2; 1) is provided as described above in connection with the first workpiece (1; 2). The second workpiece (2; 1) can already be displaced into the working region (63; 62) while the first workpiece (1; 2) is being machined. Another sequence of the supply and machining of the workpieces (1; 2) is also conceivable.

After machining the first workpiece (1; 2), for example, the vacuum pump is switched off and the pressure at the suction surfaces (77) is increased to ambient pressure. The gripping elements (131) grip the workpiece (1; 2) or continue to hold the gripped workpiece (1; 2). The support rollers (85) are raised and/or the suction elements (76) are lowered until the support plane is above the suction elements (76). The workpiece carriages (114, 115; 116, 117) displace the machined workpiece (1; 2), for example, in the second conveying direction (113) for workpiece removal, which in the exemplary embodiment takes place in the workpiece supply region (22; 23). It is also conceivable to convey the machined workpiece (1; 2) further in the first conveying direction (112), for example to a further manufacturing cell.

When arranging the manufacturing cell (10) in a linked manufacturing process, it is conceivable to hold the gripping units (131) on the workpiece (1; 2) during the entire machining process. This eliminates the need to reposition the workpiece in a subsequent manufacturing cell (10).

The first workpiece (1) and the second workpiece (2) can also be machined in a manner parallel to one another. For example, in identical work processes, the machining robots (91, 101) may have identically designed tool units (92, 92; 102, 102). With such an embodiment, two workpieces (1, 2) lying on the adjacent workpiece paths (11, 12) may be machined at the same time with different work processes.

The workpiece (1; 2) to be machined can also be wider than a single workpiece path (11; 12). For example, it then projects into the other workpiece path (12; 11). The machining of such a workpiece (1; 2) is carried out as described above. In this case, the following workpiece (2; 1) does not travel into the working region (62; 63) until the preceding workpiece (1; 2) has left both working regions (62; 63).

If necessary, a workpiece (1; 2) machined in a first clamping operation, for example, can be moved into the workpiece supply (21) by means of the transverse thrust device (41) onto the respective other workpiece path (12; 11), in order to be further machined there by means of a further tool unit (92; 102).

Combinations of the individual exemplary embodiments are also conceivable.

LIST OF REFERENCE SIGNS

1 Workpiece, first workpiece
2 Workpiece, second workpiece
3 Longitudinal side of workpiece
5 Longitudinal direction
6 Transverse direction
7 Height direction
10 Manufacturing cell
11 Workpiece path, first workpiece path
12 Workpiece path, second workpiece path
21 Workpiece supply
22 Workpiece supply region
23 Workpiece supply region
24 Bed
25 Load-bearing roller path
26 Load-bearing roller path
27 Load-bearing rollers
28 Workpiece carriage guide rails
29 Conductor paths
31 Load-bearing roller carrier
32 Transverse guides
33 Toothed rack
41 Transverse thrust device
42 Rake
43 Transverse slide
44 Lifting device
45 Tine carrier
46 Tines 51 Stop bar
52 Stop device
53 Stop device
54 Pin carrier
55 Stop pin
56 Stop pin
57 Cylinder, double-acting
61 Machine tool
62 Working region
63 Working region
64 Machine bed
65 Workpiece table
66 Suction block guide paths
67 Workpiece carriage guide rails
71 Suction block assembly
72 Support beam
73 Guide assemblies
74 Guide shoes
75 Clamping device
76 Suction elements
77 Suction surface
78 Suction cup
79 Support beam coupling
81 Support device
82 Lifting device
83 Lifting cylinder
84 Guide cylinder
85 Support roller
86 Support beam
91 Machining robots
92 Tool unit, drilling and milling unit
93 Swivel head
94 Tool, drilling tool
101 Machining robot
102 Tool unit, gluing unit
103 Swivel head
104 Edge gluer
111 Conveyor device
112 Conveying direction, first conveying direction
113 Second conveying direction
114 Workpiece carriage
115 Workpiece carriage
116 Workpiece carriage
117 Workpiece carriage
118 Housing
121 Guide unit
122 Recirculating ball bearing unit
125 Drive unit
126 Power and signal supply
127 Drive wheels
131 Gripping unit
132 Parallel gripping device
133 Clamping jaw, top
134 Clamping jaw, bottom
141 Docking coupling
142 Plunger
143 Plug
165 Workpiece table
171 Suction block assembly

The invention claimed is:

1. A manufacturing cell (10), comprising:
   a machine tool (61) with at least two machining robots (91, 101);
   a first workpiece path (11) running in a longitudinal direction (5) of the manufacturing cell (10) and having a workpiece supply region (22) of a workpiece supply (21) and
   a workpiece table (65) of the machine tool (61),
     wherein the workpiece table (65) comprises at least one first suction block assembly (71); and
   a second workpiece path (12) running parallel to the first workpiece path (11; 12), with a second workpiece table (165) comprising at least one second suction block assembly (171),
   wherein the first workpiece path (11) is configured for processing a first workpiece (1),
   wherein the second workpiece path (12) is configured for processing a second workpiece (2) independently of the first workpiece (1),
   wherein each suction block assembly (71; 171) comprises
     a support beam (72) arranged perpendicular to the longitudinal direction (5),
     suction elements (76) carried on the support beam (72), and
     a lifting device (82) with a transverse support roller (85), the lifting device (82) being arranged on the support beam (72),
     wherein the transverse support roller (85) is rotatably mounted about a horizontal roller axis perpendicular to the longitudinal direction (5) in a U-shaped support beam (86),
     wherein the transverse support roller (85) extends laterally across the suction elements (76),
     wherein the lifting device (82) includes a central lifting cylinder (83) and two guide cylinders (84).
     wherein the lifting device (82) is configured to lift the transverse support roller (85) into a support position above an upper suction surface (77) of the suction elements (76) and retract the transverse support roller (85) into a standby position below the upper suction surface (77) of the suction elements (76), and
   wherein each suction block assembly (71; 171) can be displaced in the longitudinal direction (5) of the manufacturing cell (10).

2. The manufacturing cell (10) according to claim 1, wherein the suction elements (76) of each suction block assembly (71; 171) can be displaced individually in a height direction (7).

3. The manufacturing cell (10) according to claim 2, wherein each suction element (76) can be pressurized pneumatically and individually with negative pressure.

4. The manufacturing cell (10) according to claim 1, wherein each machining robot (91; 101) carries a tool unit (92; 102),
wherein at least one tool unit (92; 102) has tools (94) for cutting machining.

5. The manufacturing cell (10) according to claim 4, wherein at least one of the tools (94) is a drilling tool (94).

6. The manufacturing cell (10) according to claim 1, wherein the workpiece supply (21) has at least one lowerable or tiltable stop device (52; 53) per workpiece path (11; 12).

7. The manufacturing cell (10) according to claim 1, wherein the second workpiece path (12; 11) has a second workpiece supply region (23; 22), and
wherein the workpiece supply region (22; 23) and the second workpiece supply region (23; 22) have a common, lowerable transverse thrust device (41).

8. The manufacturing cell (10) according to claim 1, wherein each workpiece path (11; 12) is assigned at least one workpiece carriage (114, 115; 116, 117),
wherein each workpiece carriage (114, 115; 116, 117) can be displaced in the longitudinal direction (5), and wherein each workpiece carriage (114, 115; 116, 117) has a gripping unit (131) for gripping a workpiece (1; 2), and wherein each workpiece carriage (114, 115; 116, 117) has a guide unit (121) for guidance along the manufacturing cell (10).

9. The manufacturing cell (10) according to claim 8, wherein the respective gripping unit (131) is adjustable relative to the guide unit (121) in a height direction (7).

10. The manufacturing cell (10) according to claim 1, wherein each suction block assembly (71; 171) comprises three of the suction elements (76).

11. The manufacturing cell (10) according to claim 1,
wherein the first workpiece path (11) comprises a plurality of first load-bearing rollers,
wherein the second workpiece path (12) includes a plurality of second load-bearing rollers, each of the second load-bearing rollers being coaxial with one of the first load-bearing rollers, and
wherein a width of each of the first load-bearing rollers is equal to or greater than a width of the first workpiece, and
wherein a width of each of the second load-bearing rollers is equal to or greater than a width of the second workpiece.

12. The manufacturing cell (10) according to claim 1,
wherein the suction elements (76) are individually adjustable in height, and
wherein suction elements (76) located in a region of the first workpiece (1) to be machined are lowered to prevent damaging the suction block assembly during machining.

13. The manufacturing cell (10) according to claim 1,
wherein the at least one first suction block assembly (71) extends across a width of the first workpiece path (11), and
wherein the at least one second suction block assembly (171) is arranged coaxially with the at least one first suction block assembly (71) and extends across a width of the second workpiece path (12).

14. The manufacturing cell (10) according to claim 1,
wherein the at least one first suction block assembly (71) includes a plurality of first suction block assemblies spaced along the longitudinal direction (5) of the first workpiece path (11), and
wherein the at least one second suction block assembly (171) includes a plurality of second suction block assemblies spaced along the longitudinal direction (5) of the second workpiece path (12).

15. A manufacturing cell (10), comprising:
a workpiece supply (21);
a machine tool (61) with at least two machining robots (91, 101);
a first workpiece path (11), including
 a first workpiece supply region (22) of the workpiece supply (21),
 a first workpiece table (65) of the machine tool (61) with a first suction block assembly (71),
 a first guide rail (28) extending along the first workpiece path (11), and
 at least two self-propelled first workpiece carriages (114, 115) configured to be displaced along the first guide rail (28) and thereby transport a first workpiece (1) between the first workpiece supply region (22) and the first workpiece table (65); and
a second workpiece path (12), including
 a second workpiece supply region (23) of the workpiece supply (21), and
 a second workpiece table (165) of the machine tool (61) with a second suction block assembly (171),
 a second guide rail (28) extending along the second workpiece path (12), and
 at least two self-propelled second workpiece carriages (116, 117) configured to be displaced along the second guide rail (28) and thereby transport a second workpiece (2) between the second workpiece supply region (23) and the second workpiece table (165),
wherein the first workpiece path (11) extends in a longitudinal direction (5) of the manufacturing cell (10), and
wherein the second workpiece path (12) extends parallel to the first workpiece path (11),
wherein the first suction block assembly (71) and the second suction block assembly (171) each comprise
 a support beam (72) arranged perpendicular to the longitudinal direction (5),
 suction elements (76) carried on the support beam (72), and
 a lifting device (82) with a transverse support roller (85), the lifting device (82) being arranged on the support beam (72),
 wherein the transverse support roller (85) is rotatably mounted about a longitudinal roller axis that extends lateral to the longitudinal direction (5) in a U-shaped support beam (86)
 wherein the transverse support roller (85) extends laterally across the suction elements (76),
 wherein the lifting device (82) includes a central lifting cylinder (83) and two guide cylinders (84),
 wherein the lifting device (82) is configured to lift the transverse support roller (85) into a support position above an upper suction surface (77) of the suction elements (76) and retract the transverse support roller (85) into a standby position below the upper suction surface (77) of the suction elements (76), and
wherein the first suction block assembly (71) and the second suction block assembly (171) can be displaced in the longitudinal direction (5) of the manufacturing cell (10).

16. The manufacturing cell (10) according to claim 15, further comprising a transverse thrust device (41) arranged between the first workpiece path (11) and the second workpiece path (12)
for moving the first workpiece (1) towards the at least two self-propelled first workpiece carriages (114, 115) and
for moving the second workpiece (2) towards the at least two self-propelled second workpiece carriages (116, 117).

* * * * *